(12) United States Patent
Borkholder

(10) Patent No.: US 9,868,327 B1
(45) Date of Patent: Jan. 16, 2018

(54) TORSION HITCH RECEIVER

(71) Applicant: Carl Borkholder, Bremen, IN (US)

(72) Inventor: Carl Borkholder, Bremen, IN (US)

( * ) Notice: Subject to any disclaimer, the term of this patent is extended or adjusted under 35 U.S.C. 154(b) by 0 days.

(21) Appl. No.: 15/286,111

(22) Filed: Oct. 5, 2016

(51) Int. Cl.
  *B60D 1/24* (2006.01)
  *B60D 1/50* (2006.01)
  *B60D 1/06* (2006.01)

(52) U.S. Cl.
  CPC ............ *B60D 1/24* (2013.01); *B60D 1/065* (2013.01); *B60D 1/50* (2013.01); *B60D 1/248* (2013.01)

(58) Field of Classification Search
  CPC ............. B60D 1/24; B60D 1/50; B60D 1/065
  See application file for complete search history.

(56) References Cited

U.S. PATENT DOCUMENTS

| | | | | |
|---|---|---|---|---|
| 4,792,154 A * | 12/1988 | Kerst | ............... | B60D 1/50 280/489 |
| 6,698,785 B2 * | 3/2004 | Peters | ............... | B60D 1/07 280/489 |
| 6,957,825 B2 * | 10/2005 | Peters | ............... | B60D 1/07 280/483 |
| 7,775,544 B2 * | 8/2010 | Bouwkamp | ............... | B60D 1/143 280/483 |
| 9,505,281 B1 * | 11/2016 | Borkholder | ............... | B60D 1/248 |
| 2003/0178811 A1 * | 9/2003 | Buckner | ............... | B60D 1/50 280/483 |
| 2005/0263984 A1 * | 12/2005 | Gurtler | ............... | B60D 1/485 280/489 |

* cited by examiner

*Primary Examiner* — Tony H Winner
*Assistant Examiner* — Michael R Stabley
(74) *Attorney, Agent, or Firm* — Botkin & Hall, LLP

(57) ABSTRACT

A torsion hitch receiver is provided having a frame that has a portion that mounts to a vehicle. The frame includes an upper torsion tube that carries an upper torsion bar. Attached to the upper torsion tube is a torsion housing that affixes a lower torsion tube. The upper torsion bar has an upper torsion arm that rotates with the upper torsion bar, and a lower torsion bar, carried within the lower torsion tube, the lower torsion bar has lower torsion arms. Both upper and lower torsion arms attach to a receiver housing that can receive a draw bar. As weight is applied to the receiver housing, the torsion bars allow rotation. As the torsion bars rotate, the receiver housing moves up and down.

14 Claims, 7 Drawing Sheets

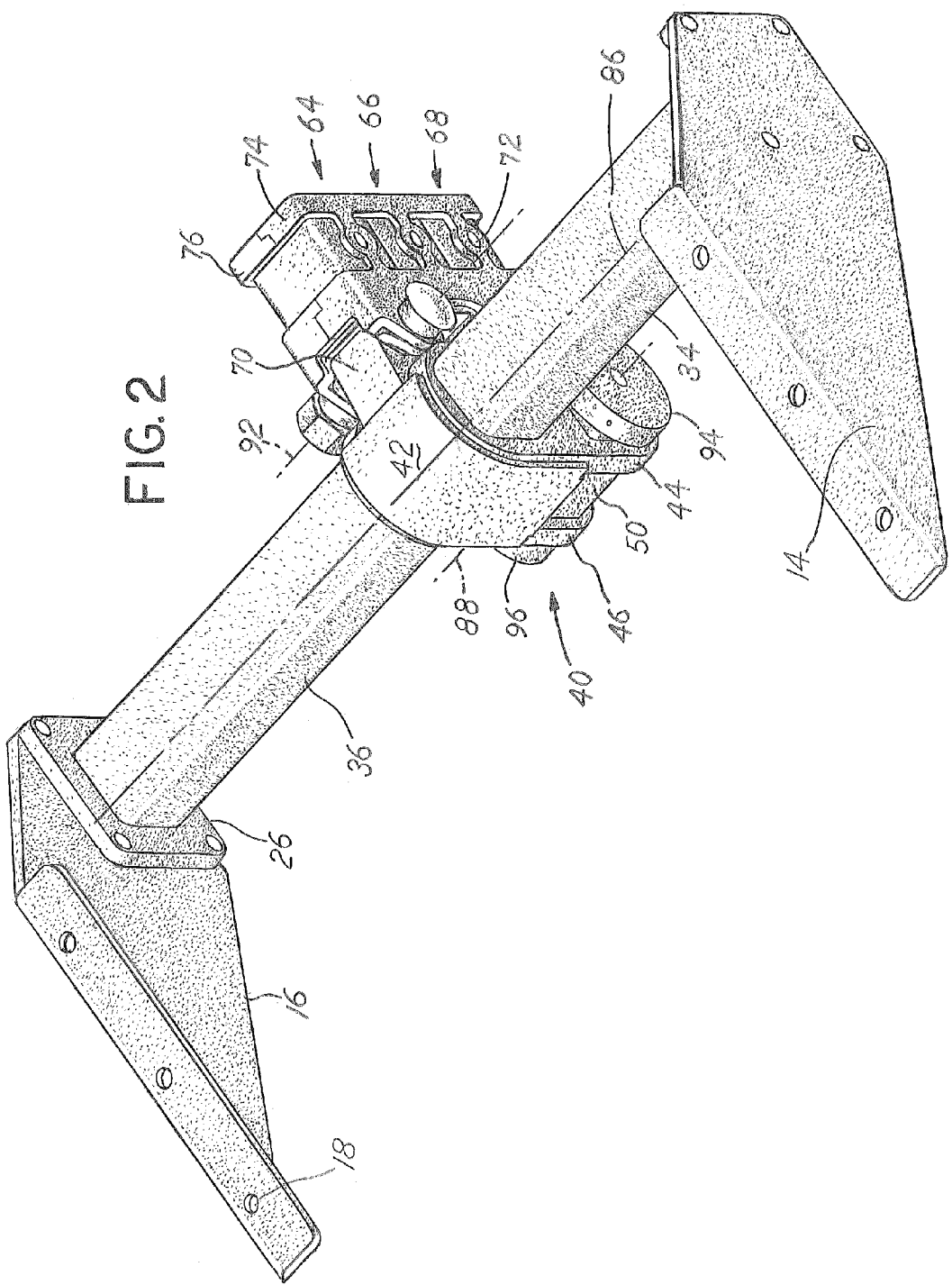

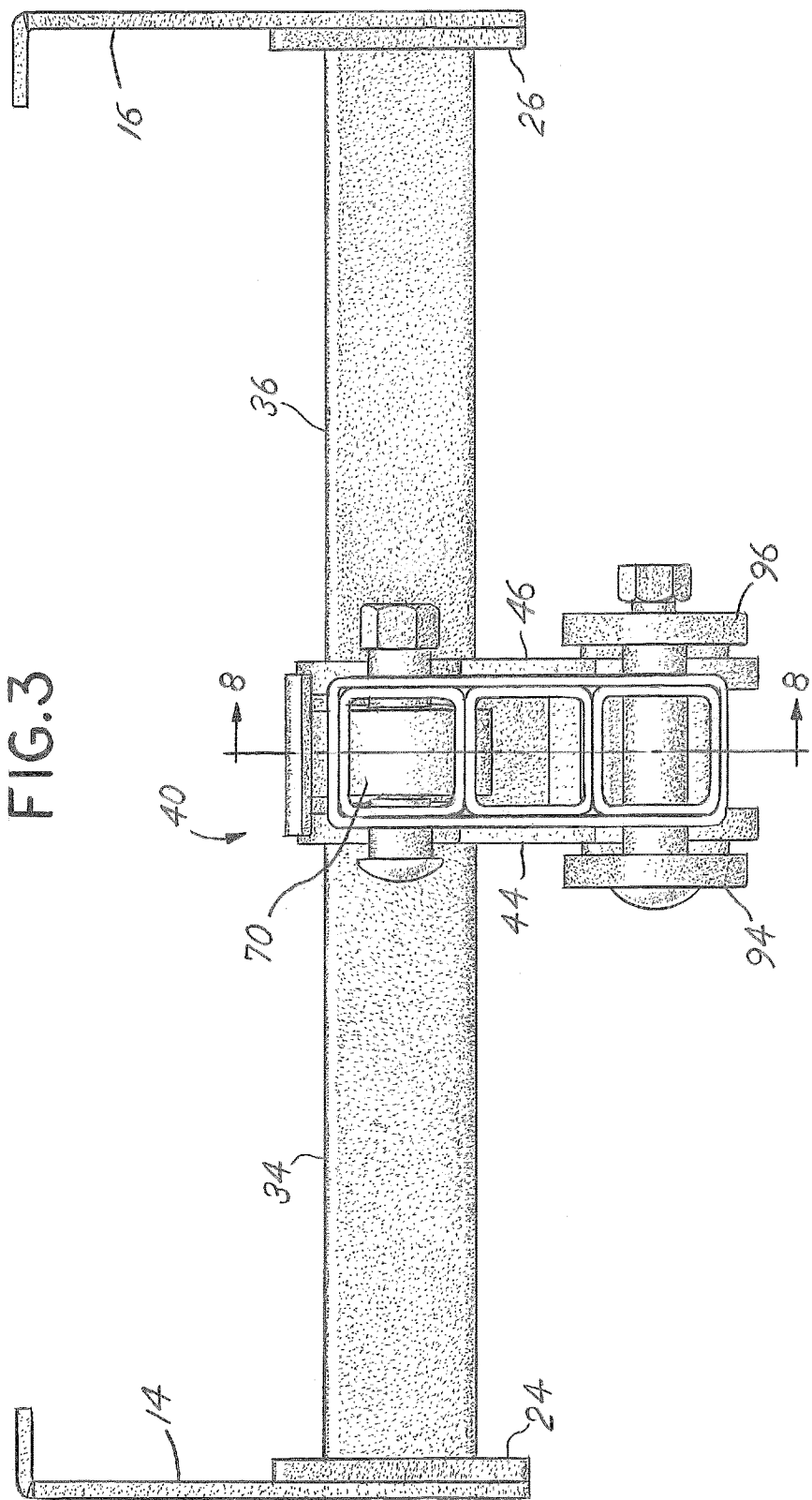

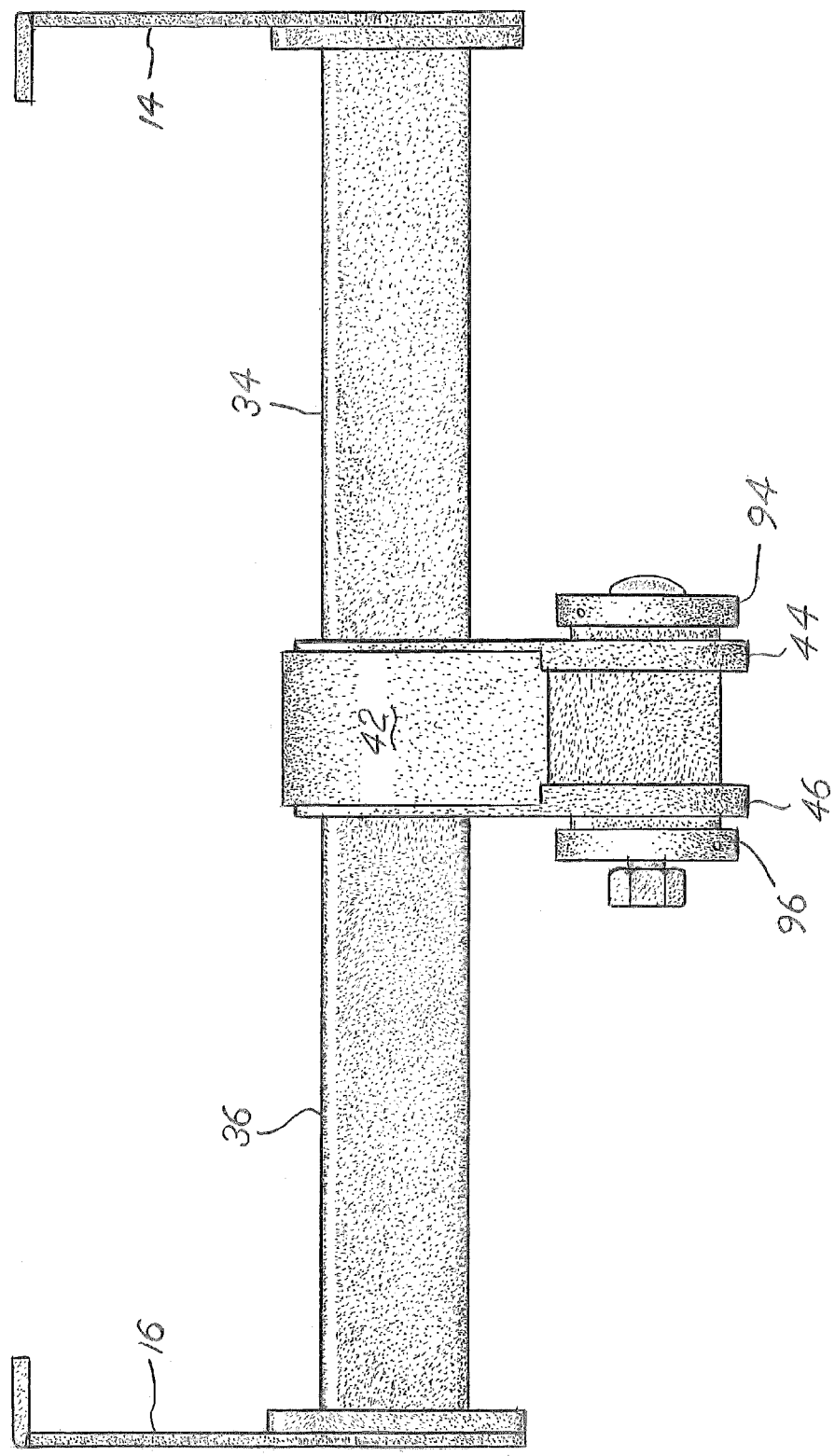

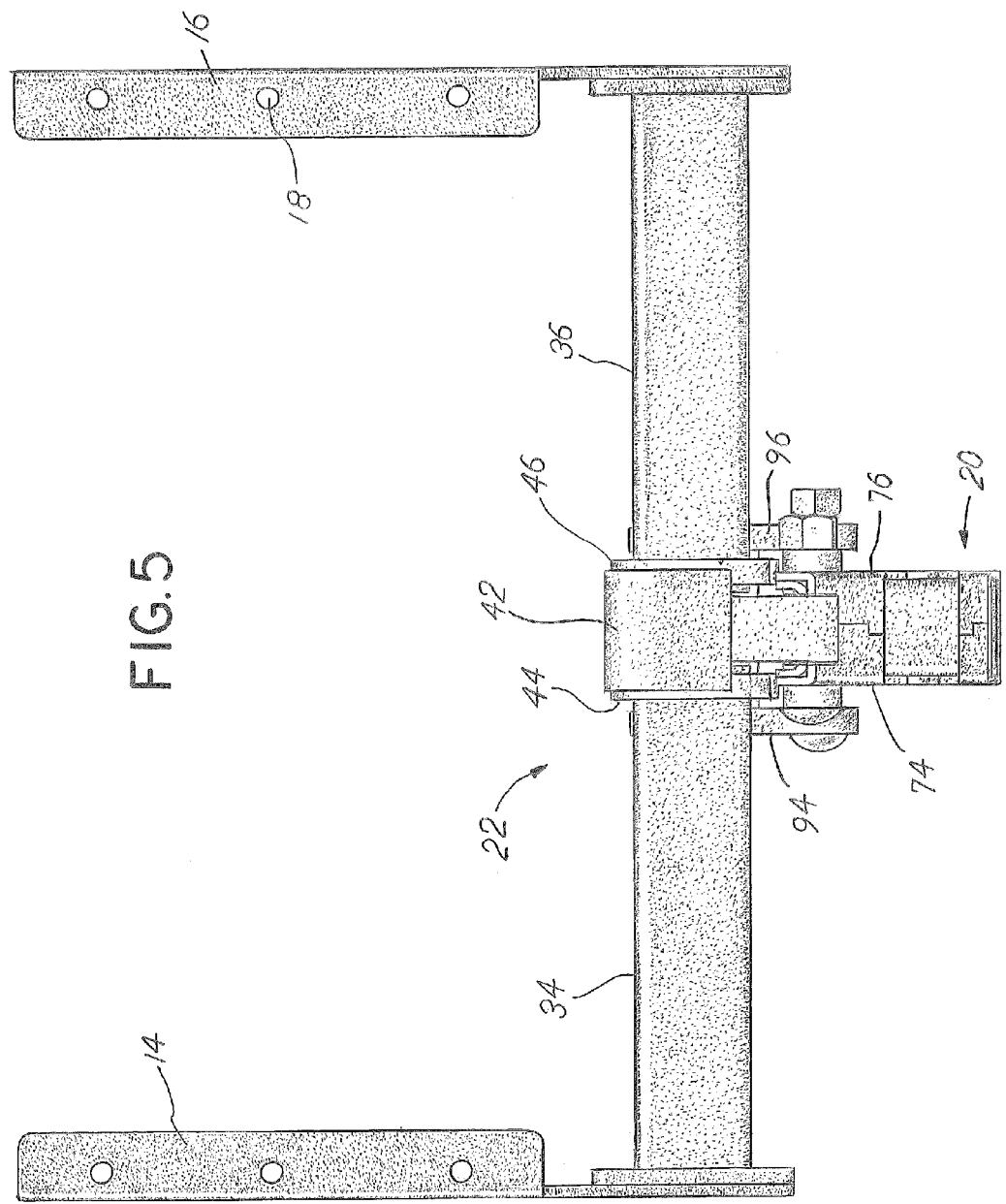

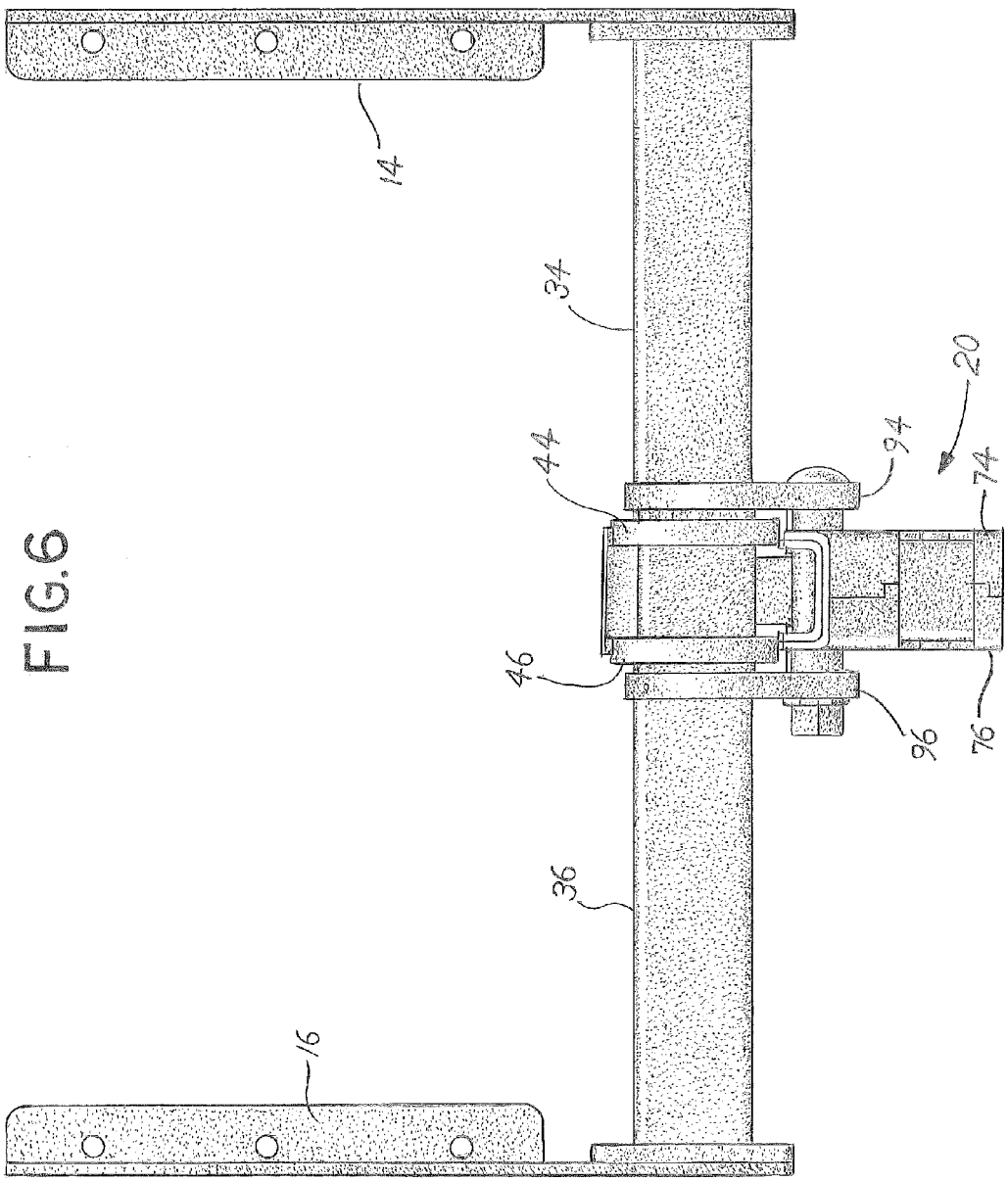

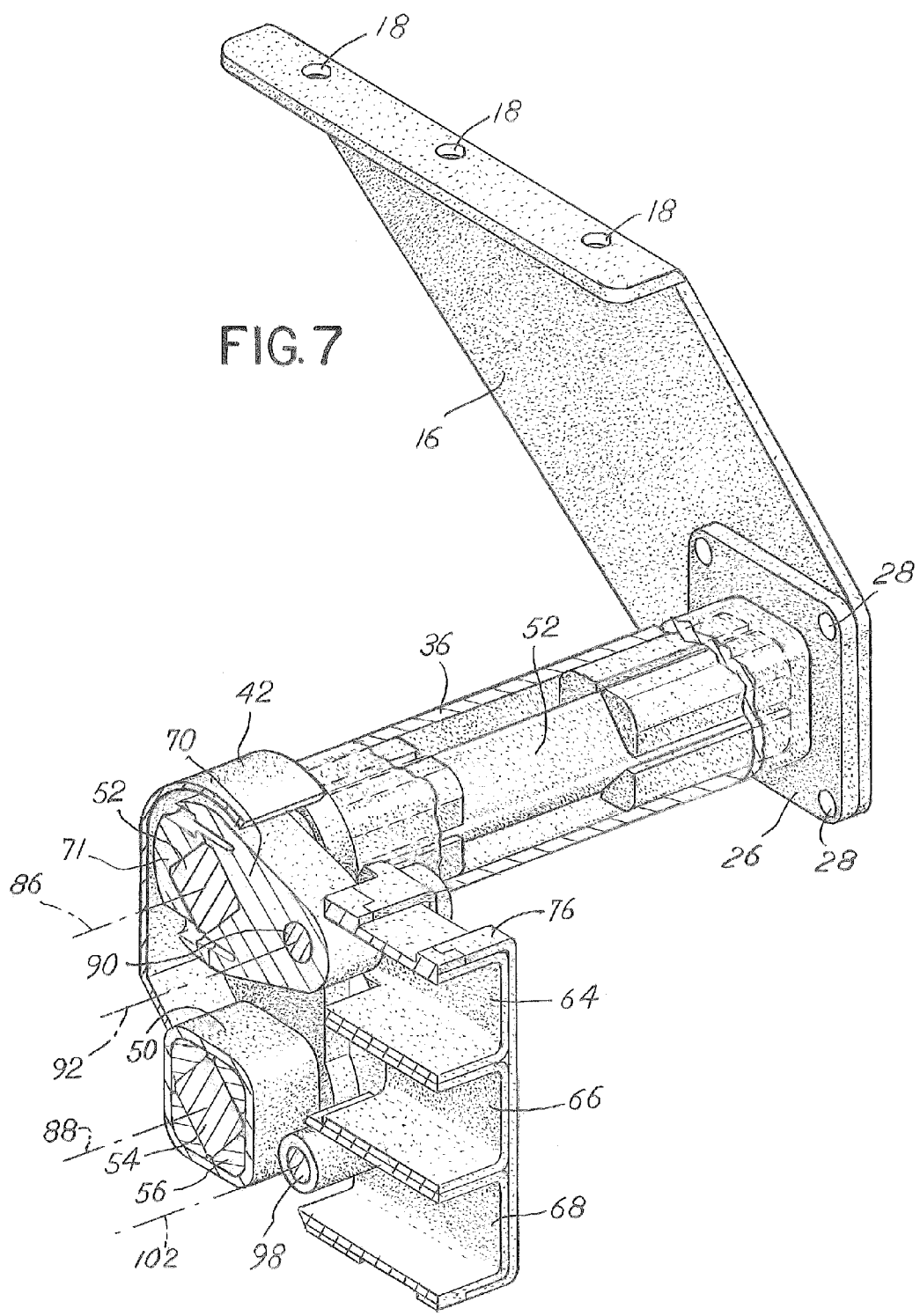

TORSION HITCH RECEIVER

BACKGROUND OF THE INVENTION

This present disclosure relates to vehicle mounted hitch receivers and the attachment between a trailer and a towing vehicle. Commonly, when being towed by a vehicle, the trailer is subject to transient forces as the towing vehicle pulls the trailer over various terrain or when loads are moved or placed on the trailer. Trailers have a tongue weight that is borne by the towing vehicle. Some tongue weight is necessary but it is desirable to limit the amount transmitted to the towing vehicle. The transient forces on the trailer can translate to transient tongue forces transmitted to the towing vehicle, at the very least, can be unsettling to the driver. In an extreme situation, the transient tongue forces can create a dangerous loss of control. One option is to use a receiver adapter that can be located between the trailer and the towing vehicle, but the adapter increases the distance between the vehicle and the trailer. An improved receiver is needed.

SUMMARY OF THE INVENTION

The present disclosure describes a vehicle mounted torsion hitch receiver that will permanently attach to a towing vehicle and absorb transient tongue loading either caused by the towing vehicle or the trailer. By implementing a torsion device, the hitch receiver allows for limited relative vertical motion between the towing vehicle and the trailer tongue. The hitch receiver has multiple receiver holes that are vertically stacked to give the user several height options of where to connect up a ball. The vertical stacking is frequently necessary when the trailer tongue height varies from trailer to trailer, and also the height of the receiver on different towing vehicles is different. An optional indicator measures the displacement between a loaded position and an unloaded position to allow the user to monitor tongue loading.

BRIEF DESCRIPTION OF THE DRAWINGS

A preferred embodiment of this invention has been chosen wherein:

FIG. 2 is a rear isometric view of the hitch receiver;
FIG. 3 is a front view of the hitch receiver;
FIG. 4 is a rear view of the hitch receiver;
FIG. 5 is a top view of the hitch receiver;
FIG. 6 is a bottom view of the hitch receiver;
and
FIG. 7 is a section view 8-8 of the hitch receiver in FIG. 3.

DESCRIPTION OF THE PREFERRED EMBODIMENT

Figure 1:
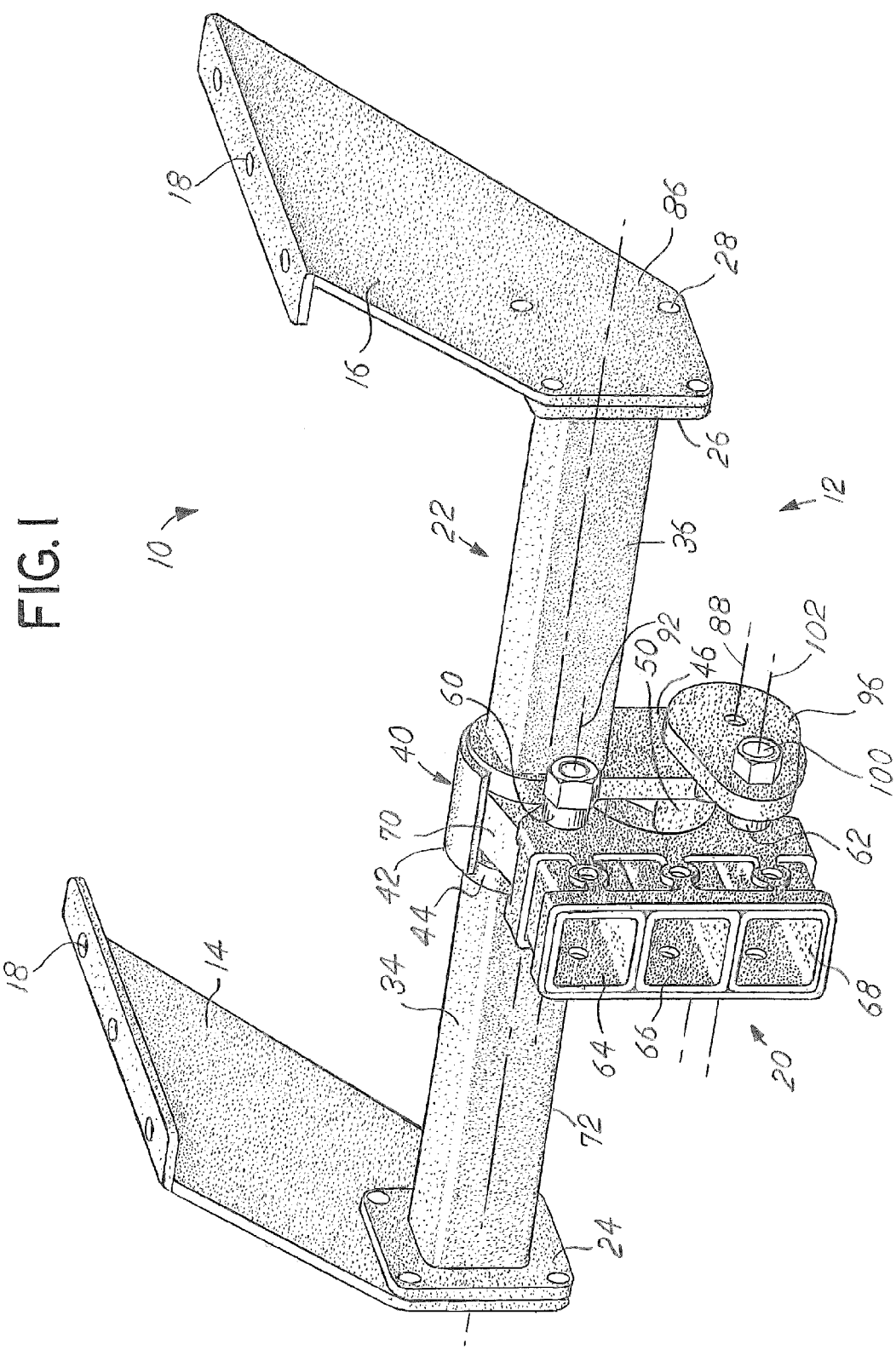
FIG. 1 is a front isometric view of the hitch receiver.

A vehicle mounted hitch receiver 10 is shown in FIGS. 1-7 that has a frame 12 with a first mounting portion 14 and a second mounting portion 16. The mounting portions 14, 16 are designed to affix the receiver 10 to a structurally sound part of a vehicle (not shown), commonly a frame or reinforced area of a vehicle's body. Holes 18 are drilled or stamped into the mounting portions 14, 16 to allow the attachment. Typically, the hitch receiver 10 is permanently affixed to the vehicle but it is contemplated the receiver 10 is removable. The location, size, and shape of the holes 18 and mounting portions 14, 16 will vary from vehicle to vehicle. Some embodiments can further include tapped holes in addition to or where holes 18 are currently shown. The mounting portions 14, 16 are shown as a formed stamping, but other shapes and materials are contemplated. A receiver portion 20 is designed to receive a draw bar with a towing hitch ball (not shown). The draw bar is then affixed to the receiver portion 20 through a pin or other locking feature. Locking draw bars to hitch receivers is well-known in the art.

Located between the mounting portions 14, 16 is a center section 22 that is attached to the mounting portions 14, 16 by flanges 24, 26. The flanges 24, 26 attach to their respective mounting portions 14, 16 through fasteners 28 or welding. A first upper torsion tube 34 is affixed to flange 24 and a second upper torsion tube 36 is affixed to flange 26. The torsion tubes 34, 36 are coaxial and mechanically connected by a torsion housing 40. The center section 22 shows torsion tubes 34, 36 extending completely between the mounting portions 14, 16, but it is contemplated that the torsion tubes 34, 36 only extends partially. For example, some vehicles have obstructions that are not movable, such as exhaust pipes, bumper features, or other frame protrusions that prevent a straight torsion tube from extending across. In this event, the mounting portions 14, 16 may further contain a structural piece that connects its respective torsion tube 34, 36. The torsion housing 40 is made up of a curved back 42, a first side 44, and a second side 46, shown in FIGS. 4-6. The back 42, first side 44, and second side 46 are all mechanically fixed together, typically through welding or fasteners. First side 44 is affixed to torsion tube 34 and second side 46 is affixed to torsion tube 36. Also located in the torsion housing 40 is a lower torsion tube 50. The lower torsion tube 50 is affixed to side 44 at a terminal end and affixed to side 46 at the opposite terminal end.

The torsion housing 40 is an assembly of a series of parts made from flat or bent sheet metal that is welded or affixed together to the torsion tubes 34, 36 to form a single structural component. In addition to the bent and flat sheet metal is a lower torsion tube 50. Each torsion tube 34, 36, 50 is mostly square and has a corresponding central axis 86, 88. A section view of the torsion housing is shown in FIG. 7. The central axis 86 of the upper tubes 34, 36 is parallel to the central axis 88 of the lower tube 32. The central axes 86, 88 do not have to be exactly parallel, only sufficiently parallel for the mechanism to move without binding. The torsion housing 40 and upper tubes 34, 36 are fixed with respect to the mounting portions 14, 16.

Residing inside the upper tubes 34, 36 is an upper torsion bar 52 and inside the lower tube 50 is a lower torsion bar 54. As shown, the upper torsion bar 52 extends outwardly to the outer ends of the upper torsion tubes 34, 36. The lower torsion bar 54 extends beyond the ends of the lower torsion tube 50. The torsion bars 52, 54 can be seen in the cross section of FIG. 7. Surrounding the torsion bars 52, 54 are resilient cords 56. The resilient cord 56 supports the torsion bars 52, 54 and centers them about their corresponding axis 86, 88. As shown, the torsion bars 52, 54 are angled with respect to their corresponding tube 34, 36, 50 with the flats facing corners of the tube. This creates substantially triangular shaped cavities that receive the resilient cords 56. They fit in the corners of the tubes and overlay the flat surfaces of the torsion bars 52, 54. A torsion bar located inside a torsion tube and surrounded by resilient cords is commonly known in the suspension and spring art.

The upper torsion arm 70 is fixed to and rotates with the upper torsion bar 52. The upper torsion arm 70 is affixed in the middle and is wide enough to be close to both sides 44, 46 to prevent excessive axial movement of the upper torsion bar 52 and upper torsion arm 70 along the upper central axis 86. At the end of the upper torsion arm 70 is an upper pivot point 90. The upper pivot point 90 forms an upper pivot axis 92. The upper pivot axis 92 is parallel to and offset from the upper central axis 86, shown in FIG. 1. The axes 92, 86 do not have to be exactly parallel, only sufficiently parallel for the mechanism to move without binding. As shown in FIG. 7, the upper torsion arm 70 has a rear piece 71 that attaches to the upper torsion arm 70 and the two affix around the upper torsion bar 52.

Attached to ends of the lower torsion bar 54 are lower torsion arms 94, 96. The lower torsion arms 94, 96 overlay a portion of the sides 44, 46 and rotate with the lower torsion bar 54 as shown in FIG. 1. The lower torsion arms 94, 96 are affixed to the terminal ends of the lower torsion bar 54 sufficiently close to the sides 44, 46 to prevent excessive axial movement of the lower torsion bar 54 and lower torsion arms 94, 96 along the lower central axis 88. At the end of each lower torsion arm 94, 96 is a corresponding lower pivot point 98, 100. Both lower pivot points 98, 100 align to form a lower pivot axis 102. The lower pivot axis 102 is parallel to and offset from the lower central axis 88. The axes 88, 102 do not have to be exactly parallel, only sufficiently parallel for the mechanism to move without binding.

The receiver portion 20 has an upper pivot tube 60 and a lower pivot tube 62 that are spaced similarly to the pivot points. The receiver portion 20, as shown in all FIGS. shows a series of receivers 64-68 for example. Each receiver 64-68 is made from a rectangular tube, visible in FIG. 3, and is sized to receive a slide-in ball hitch or similar device and has transverse holes 72 that are adapted to receive a pin to affix the slide-in ball hitch (not shown). While three receivers are shown, it is contemplated that a single receiver or several receivers are affixed to the receiver portion 20. The receiver portion 20 has sides 74, 76 that reinforce and align the receivers 64-68. The pivot tubes 60, 62 extend through the sides 74, 76 and the uppermost 64 and lowermost 68 receivers. The pivot tubes 60, 62 are long enough to fit between the pivot arms without allowing excessive axial movement along the pivot axes 92, 102.

Due to the resilient nature of the cords 56, the torsion bars 52, 54 are held in a neutral or resting position (as shown in all FIGS) where all of the cords 56 equally apply pressure to the outside flat surfaces of the torsion bar 52, 54. The cords 56 are shown in FIG. 7. When a load is applied and the torsion bar 52, 54 begins to rotate, the torsion bar 52, 54 is urged toward the neutral position by the cords 56.

As weight is added to the receiver portion 20 (by the separate towing hook or ball), the entire receiver portion 20 moves down and the pivot arms rotate. The cords 56 become distorted by the flat surfaces of the torsion bars 52, 54 as they rotate. The resiliency of the cord 56 resists the distortion. The more the torsion bar rotates, the more the cords resist. The spacing of the pivot arms, pivot points 90, 98, 100 and central axis 86, 88 causes the receiver portion 20 to move vertically with minimal to no rotation or angular change with respect to the mounting portions 14, 16.

An optional displacement or load indicator (not shown) can be implemented to show the user the amount of tongue weight or displacement of the receiver portion 20 with respect to the fixed portion 12. The indicator has a needle that is fixed to one of the pivot arms. As the weight on the receiver portion 20 increases, the displacement indicator shows the user how much load is present. The torsion housing 40 may have a reference line or feature. As the pivot arm rotates, the needle moves with respect to the feature, showing the user the amount of load on the hitch receiver 10. A fastener holds the needle and allows adjustment of the needle to set a desired number or zero reference.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A torsion hitch receiver adapted to be permanently affixed to a towing vehicle, said torsion hitch receiver adapted to receive an accessory draw bar, said receiver comprising:

a frame having a first and second vehicle attaching portion adapted to be affixed to a portion of said towing vehicle, said frame having a center portion affixed to and located between said vehicle attaching portions, said center portion having a first and second upper torsion tube carrying an upper torsion bar on an upper central axis, said first upper torsion tube affixed to said first vehicle attaching portion, said second upper torsion tube affixed to said second vehicle attaching portion, said upper torsion bar resisting rotation with respect to said upper torsion tubes;

said center portion having a torsion housing affixed to and located between said first and second upper torsion tubes, said torsion housing having a lower torsion tube with a lower central axis, said torsion housing having a first side and a second side, said lower torsion tube being spaced from said first and second upper torsion tubes, said upper and lower central axes being substantially parallel, said upper torsion bar extending through said torsion housing;

an upper torsion arm affixed to said upper torsion bar and extending outwardly from said torsion housing, a portion of said upper torsion bar located between said first side and said second side of said torsion housing, said upper torsion arm having an upper pivot point spaced from said upper torsion bar;

lower torsion arms affixed to terminal ends of a lower torsion bar, said lower torsion bar being held within said lower torsion tube to resist rotation with respect to said lower torsion tube, one of said lower torsion arms adjacent said first side of said torsion housing, the other of said lower torsion arms adjacent said second side of said torsion housing, each said torsion arm having a lower pivot point spaced from said lower torsion bar;

a receiver assembly connected to and movable with respect to said torsion housing and having an upper pivot point with a central axis and a lower pivot point with a central axis, said receiver assembly having at least two receivers affixed to said receiver assembly, each said receivers adapted to receive and affix said accessory draw bar;

said pivot points of said upper and lower arms rotatably affixed to said pivot points of said receiver assembly; and said upper and lower torsion arms rotatable between an unloaded position and a loaded position and being biased toward said unloaded position, said receivers of said receiver assembly remaining substantially parallel to said draw bar when said torsion arms move from said unloaded position to said loaded position.

2. The torsion hitch receiver of claim 1, wherein said first and second upper torsion tubes are directly affixed to said first and second vehicle attaching portions.

3. The torsion hitch receiver of claim 1, wherein a curved back affixes said first side to said second side of said torsion housing.

4. The torsion hitch receiver of claim 1, wherein said upper pivot point spacing from said upper torsion bar is equal to said lower pivot point spacing from said lower torsion bar.

5. A torsion hitch receiver adapted to be affixed to a towing vehicle, said torsion hitch receiver adapted to receive an accessory draw bar, said receiver comprising:

a frame having a first and second vehicle attaching portion adapted to be affixed to a portion of said towing vehicle, said frame having an upper torsion tube affixed to said vehicle attaching portions, said upper torsion tube carrying an upper torsion bar on an upper central axis, said upper torsion bar resisting rotation with respect to said upper torsion tube;

a torsion housing affixed to said upper torsion tube and having a lower torsion tube with a lower central axis, said torsion housing having a first side and a second side, said lower torsion tube affixed to said torsion housing and being spaced from said upper torsion tube, said upper and lower central axes being substantially parallel;

an upper torsion arm affixed to said upper torsion bar and extending outwardly from said torsion housing, a portion of said upper torsion bar located between said first side and said second side of said torsion housing, said upper torsion arm having an upper pivot point spaced from said upper torsion bar;

lower torsion arms affixed to terminal ends of a lower torsion bar, said lower torsion bar being held within said lower torsion tube to resist rotation with respect to said lower torsion tube, one of said lower torsion arms adjacent said first side of said torsion housing, the other of said lower torsion arms adjacent said second side of said torsion housing, each said torsion arm having a lower pivot point spaced from said lower torsion bar;

a receiver assembly connected to and movable with respect to said torsion housing and having an upper pivot point with a central axis and a lower pivot point with a central axis, said receiver assembly adapted to receive and affix said accessory draw bar;

said pivot points of said upper and lower arms rotatably affixed to said pivot points of said receiver assembly; and said upper and lower torsion arms rotatable between an unloaded position and a loaded position and being biased toward said unloaded position, said receiver of said receiver assembly remaining substantially parallel to said draw bar when said torsion arms move from said unloaded position to said loaded position.

6. The torsion hitch receiver of claim 5, wherein said upper torsion tube is directly affixed to said first and second vehicle attaching portions.

7. The torsion hitch receiver of claim 5, wherein a curved back affixes said first side to said second side of said torsion housing.

8. The torsion hitch receiver of claim 5, wherein said upper pivot point spacing from said upper torsion bar is equal to said lower pivot point spacing from said lower torsion bar.

9. The torsion hitch receiver of claim 5, said upper torsion tube separated into a first and second torsion tube by said torsion housing, said upper torsion bar extending through said torsion housing.

10. A torsion hitch receiver adapted to be affixed to a towing vehicle, said torsion hitch receiver adapted to receive an accessory draw bar, said receiver comprising:

an upper torsion tube carrying an upper torsion bar on an upper central axis, said upper torsion bar resisting rotation with respect to said upper torsion tube;

a torsion housing affixed to said upper torsion tube and having a lower torsion tube with a lower central axis, said lower torsion tube affixed to said torsion housing and being spaced from said upper torsion tube, said upper and lower central axes being substantially parallel;

an upper torsion arm affixed to said upper torsion bar, a portion of said upper torsion arm located inside said torsion housing, said upper torsion arm having an upper pivot point spaced from said upper torsion bar;

lower torsion arms affixed to terminal ends of a lower torsion bar, said lower torsion bar being held within said lower torsion tube to resist rotation with respect to said lower torsion tube, said lower torsion arms located outside said torsion housing, each said torsion arm having a lower pivot point spaced from said lower torsion bar;

a receiver assembly connected to and movable with respect to said torsion housing and having an upper pivot point with a central axis and a lower pivot point with a central axis, said receiver assembly adapted to receive and affix said accessory draw bar;

said pivot points of said upper and lower arms rotatably affixed to said pivot points of said receiver assembly; and said upper and lower torsion arms rotatable between an unloaded position and a loaded position and being biased toward said unloaded position, said receiver of said receiver assembly remaining substantially parallel to said draw bar when said torsion arms move from said unloaded position to said loaded position.

11. The torsion hitch receiver of claim 10, said receiver further comprising first and second vehicle attaching portions, said upper torsion tube is directly affixed to said first and second vehicle attaching portions.

12. The torsion hitch receiver of claim 10, wherein said torsion housing having a curved back that affixes a first side to a second side of said torsion housing.

13. The torsion hitch receiver of claim 10, wherein said upper pivot point spacing from said upper torsion bar is equal to said lower pivot point spacing from said lower torsion bar.

14. The torsion hitch receiver of claim 10, said upper torsion tube separated into a first and second torsion tube by said torsion housing, said upper torsion bar extending through said torsion housing.

* * * * *